United States Patent
Montalvo et al.

(10) Patent No.: US 7,889,659 B2
(45) Date of Patent: Feb. 15, 2011

(54) CONTROLLING A TRANSMISSION RATE OF PACKET TRAFFIC

(75) Inventors: Rafael Mantilla Montalvo, Raleigh, NC (US); Jorge Manuel Gonzalez, Cary, NC (US); Nathan Allen Mitchell, Siler City, NC (US); Timothy F. Masterson, Raleigh, NC (US); Stephen Charles Hilla, Raleigh, NC (US); Karen A. Szypulski, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 664 days.

(21) Appl. No.: 11/735,701

(22) Filed: Apr. 16, 2007

(65) Prior Publication Data

US 2008/0253284 A1  Oct. 16, 2008

(51) Int. Cl.
H04L 12/26 (2006.01)

(52) U.S. Cl. .................................................. 370/236

(58) Field of Classification Search ......... 370/229–236, 370/395.21, 395.4–395.43, 468, 400, 410; 455/450–453; 709/231–235, 226–229
See application file for complete search history.

(56) References Cited

U.S. PATENT DOCUMENTS

| | | | |
|---|---|---|---|
| 6,721,273 B1 * | 4/2004 | Lyon ........................... 370/235 |
| 6,765,867 B2 | 7/2004 | Shanley et al. .............. 370/229 |
| 6,804,194 B1 | 10/2004 | Kadambi et al. ............ 370/229 |
| 6,850,490 B1 | 2/2005 | Woo et al. .................... 370/230 |
| 6,904,047 B2 | 6/2005 | Han et al. .................... 370/414 |
| 6,990,095 B2 | 1/2006 | Wu et al. ..................... 370/367 |
| 7,027,404 B2 | 4/2006 | Sreejith et al. .............. 370/238 |
| 7,283,471 B2 * | 10/2007 | Gutierrez et al. ............ 370/230 |
| 2003/0128703 A1 * | 7/2003 | Zhao et al. ................... 370/392 |
| 2006/0092845 A1 * | 5/2006 | Kwan et al. ................. 370/235 |
| 2007/0147245 A1 * | 6/2007 | Foore et al. ................. 370/231 |
| 2007/0165531 A1 * | 7/2007 | Labrador et al. ............ 370/235 |
| 2007/0217391 A1 * | 9/2007 | Hildebrand et al. ......... 370/351 |
| 2008/0039088 A1 * | 2/2008 | Fukushima et al. ......... 455/436 |
| 2009/0175168 A1 * | 7/2009 | Wadekar et al. ............. 370/235 |

OTHER PUBLICATIONS

U.S. Appl. No. 11/684,676, filed Mar. 12, 2007, patent application entitled "Monitoring, Controlling, and Preventing Traffic Congestion Between Processors".

* cited by examiner

Primary Examiner—Thai D Hoang
(74) Attorney, Agent, or Firm—Baker Botts L.L.P.

(57) ABSTRACT

Controlling a transmission rate of packet traffic includes receiving packets from a network processor. The packets are stored in a buffer associated with a processor. If an occupancy level of the buffer is greater than a predetermined threshold, it is determined that the processor is congested. A message is transmitted to the network processor indicating the processor is congested.

12 Claims, 2 Drawing Sheets

CONTROLLING A TRANSMISSION RATE OF PACKET TRAFFIC

TECHNICAL FIELD

This disclosure relates generally to the field of telecommunications and more specifically to controlling a transmission rate of packet traffic.

BACKGROUND

In distributed architectures, processors may communicate packets to one another through a switch. Some architectures use an N-by-(N−1) switch, which has a separate switch port interface for each processor. Thus, congestion of one interface does not affect other interfaces. N-by-(N−1) switches, however, are typically expensive. Moreover, it is sometimes difficult for N-by-(N−1) switches to accommodate additional processors because additional processors may require additional switch port interfaces.

Other architectures use a non-N-by-(N−1) switch, where processors share a switch port interface. Non-N-by-(N−1) switches, however, may experience head-of-line blocking problems. For example, a processor may be congested and unable to accept more packets. Packets for the processor may block the switch port interface that is shared by other processors. Until the waiting packets are taken from the switch port interface by the processor, packets that arrive after the waiting packets cannot be taken by the other processors. This causes a packet buildup in the shared switch port interface, also referred to as head-of-line blocking. Accordingly, congestion at one processor may deteriorate service for other processors that share the same switch port interface.

SUMMARY OF THE DISCLOSURE

In accordance with the present invention, disadvantages and problems associated with previous techniques for controlling a transmission rate of packet traffic may be reduced or eliminated.

According to one embodiment of the present invention, controlling a transmission rate of packet traffic includes receiving packets from a network processor. The packets are stored in a buffer associated with a processor. If an occupancy level of the buffer is greater than a predetermined threshold, it is determined that the processor is congested. A message is transmitted to the network processor indicating the processor is congested.

Certain embodiments of the invention may provide one or more technical advantages. A technical advantage of one embodiment may be that a flow controller monitors packet traffic from a network processor to a number of processors. If the flow controller determines that one of the processors is congested, the flow controller may transmit a message to the network processor to decrease a transmission rate of packet traffic to the congested processor.

Another technical advantage of one embodiment may be that the flow controller includes a buffer to store traffic for a particular processor. One or more predetermined thresholds of the buffer may be used to monitor an occupancy level of the buffer. If the occupancy level exceeds a first predetermined threshold, the flow controller may determine the processor is congested and transmit a message to the network processor to decrease the transmission rate. If the occupancy level is lower than a second predetermined threshold, the flow controller may determine the corresponding processor is not congested and transmit a message to the network processor to increase the transmission rate.

Another technical advantage of one embodiment may be that the flow controller transmits the message to the network processor with a priority parameter. For example, providing a priority parameter with a high level of priority for the message may result in rapid processing of the message at the network processor. Rapid processing of the message at the network processor may maximize the utilization of resources and may reduce the size of the buffer in the flow controller.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION OF THE DRAWINGS

Figure 1:
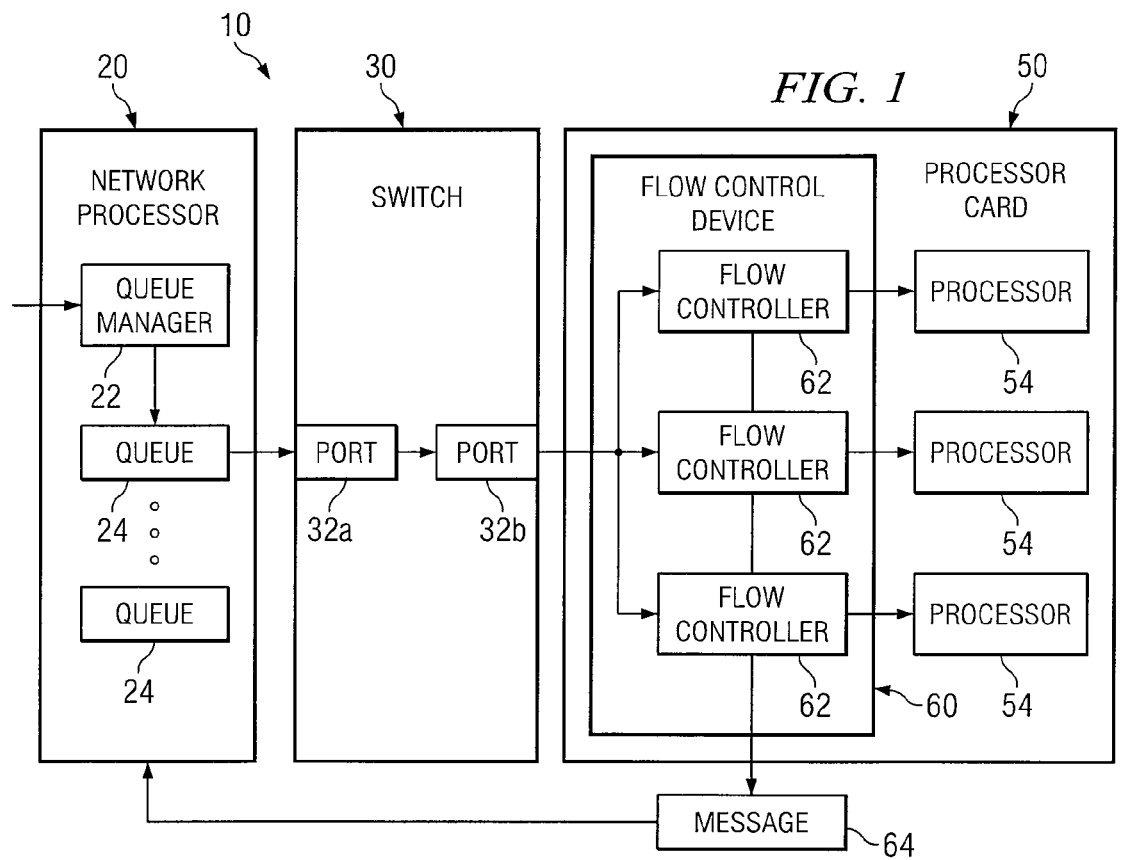
FIG. 1 illustrates one embodiment of a system that includes a flow control device for processors.
Figure 2:
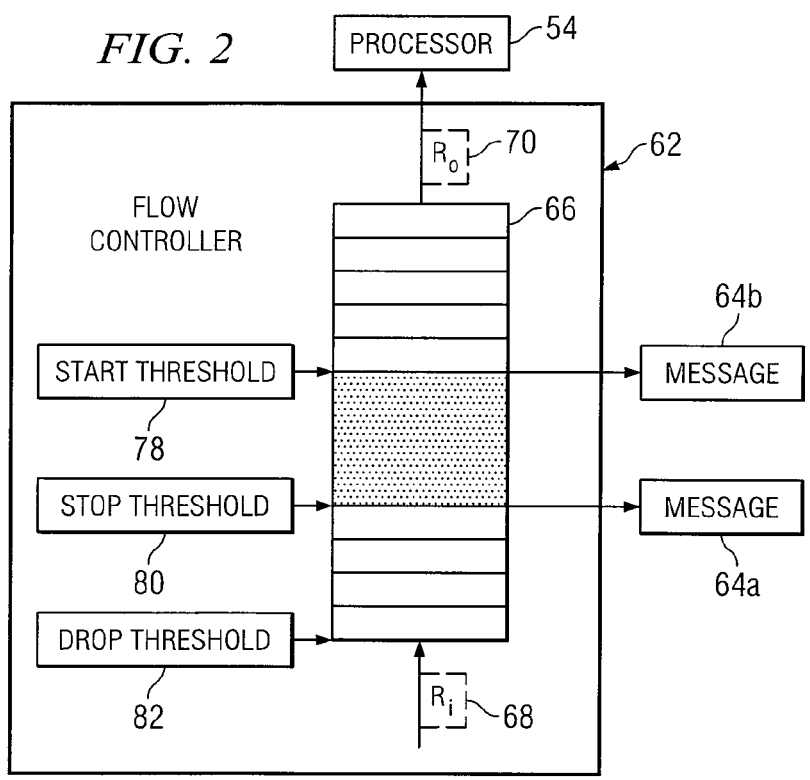
FIG. 2 illustrates one embodiment of a flow controller that may be used with the system of FIG. 1.
Figure 3:
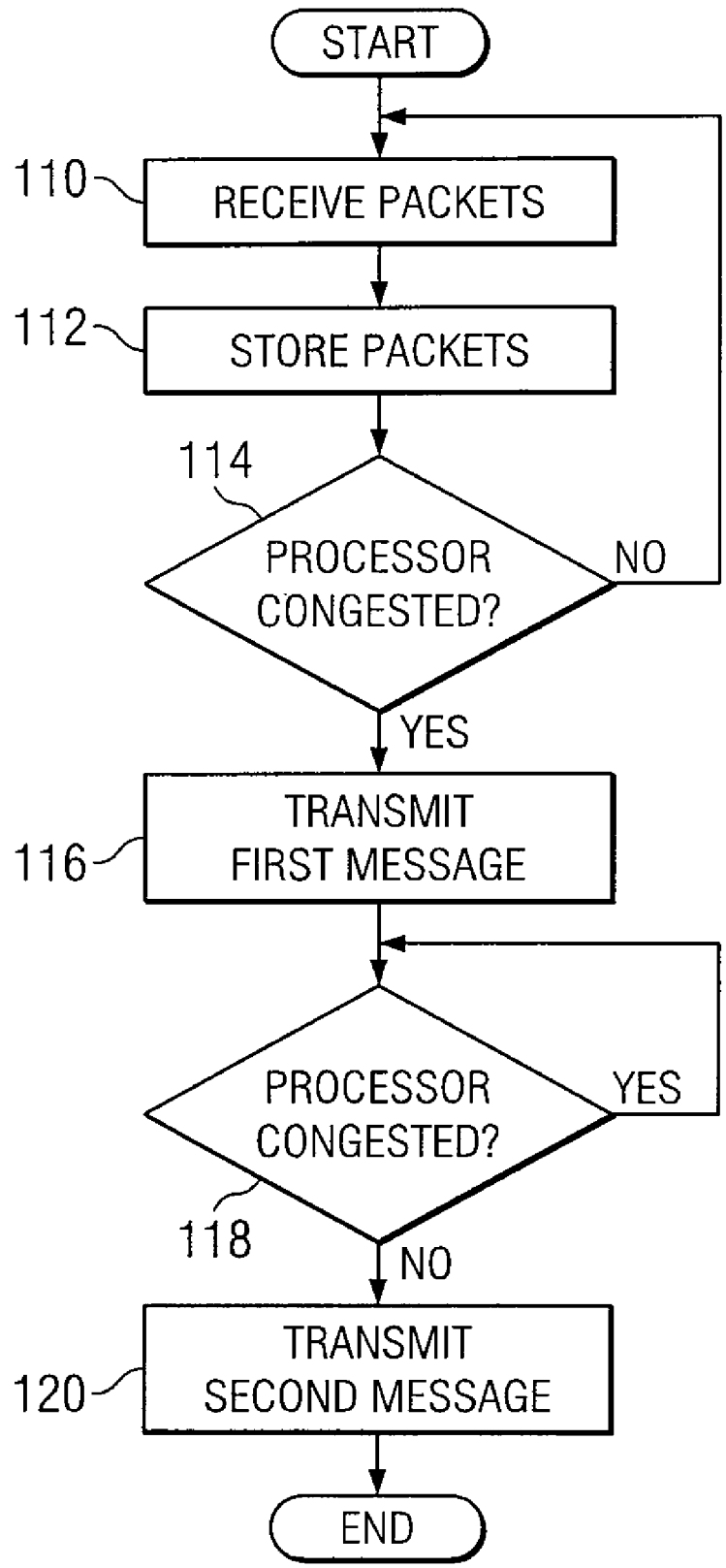
FIG. 3 illustrates one embodiment of a method for controlling a transmission rate of packet traffic that may be used by the system of FIG. 1.

Embodiments of the present invention and its advantages are best understood by referring to FIGS. 1 through 3 of the drawings, like numerals being used for like and corresponding parts of the various drawings.

FIG. 1 illustrates one embodiment of a system 10 that includes a flow control device 60 that controls data traffic to processors 54. According to the embodiment, a network processor 20 transmits packet traffic to processors 54 at a transmission rate. Flow control device 60 uses one or more flow controllers 62 to determine if processors 54 are congested. In the embodiment, flow controllers 62 may determine that processors 54 are congested by monitoring an occupancy level of a buffer storing packet traffic for processors 54. If a flow controller 62 determines that processor 54 is congested, flow controller 62 may transmit a first message 64 indicating processor 54 is congested. In response, network processor 20 may decrease the transmission rate. In one embodiment, the transmission rate may be stopped altogether.

In one embodiment, flow controller 62 may determine that processor 54 is not congested and may transmit a second message 64 indicating processor 54 is not congested. In response, network processor 20 may increase the transmission rate. In one embodiment, the transmission rate may be increased to a pre-defined maximum rate.

According to one embodiment, system 10 communicates traffic in the form of packets. A packet comprises a bundle of data organized in a specific way for transmission. Packets may be used to communicate information. Information may refer to voice, data, text, audio, video, multimedia, control, signaling, other information, or any combination of any of the preceding.

According to the illustrated embodiment, system 10 includes network processor 20, a switch 30, and a processing card 50. Network processor 20 includes a queue manager 22 and queues 24.

Network processor 20 transmits packets to processors 54. In one embodiment, network processor 20 may evenly distribute packets among processors 54. In particular embodiments, network processor 20 may be responsible for performing encryption/decryption, header parsing, address hashing, and other tasks to support packet-based communication to processors 54.

Network processor 20 may also adjust a transmission rate for packets transmitted to processors 54 using queue manager 22. Queue manager 22 controls transmission of packets through queues 24 destined for processors 54. Queues 24 store packets until the packets may be transmitted to processors 54. Queues 24 may include temporary memory such as buffers. Although FIG. 1 provides one example of network processor 20 as having one queue 24 shared by processors 54, in other embodiments network processor 20 may have one queue 24 for each processor 54.

In one embodiment, queue manager 22 may perform a rate-limiting procedure to adjust the transmission rate of packets transmitted to processors 54. For example, network processor 20 may receive message 64 indicating that processor 54 is congested. In response, queue manager 22 may decrease the transmission rate of packets destined for processor 54. As another example, network processor 20 may receive message 64 indicating that processor 54 is not congested. In response, queue manager 22 may increase the transmission rate of packets destined for processor 54.

Switch 30 facilitates communication of packets between network processor 20 and processor card 50. According to one embodiment, switch 30 may be located at a baseboard. Switch 30 may have one or more ports 32. A port 32 represents a physical interface for a device through which packets may enter or exit the device. In the illustrated embodiment, switch 30 has ports 32*a* and 32*b*. Port 32*a* communicates with network processor 20, and port 32*b* communicates with processor card 50.

Processor card 50 includes one or more processors 54 operable to perform packet processing. Processors 54 may perform arithmetic, logic, control, and/or other suitable processing operations. A processor 54 may represent a microprocessor, a central processing unit (CPU), or any other device operable to perform processing operations. In the illustrated embodiment, three processors 54 are implemented, each having a corresponding flow controller 62, and all three processors 54 share a common interface from switch port 32*b* at switch 30.

Flow control device 60 receives packets and directs the packets to flow controllers 62. Flow control device 60 may identify a destination flow controller 62 and corresponding processor 54 for a packet using various techniques. For example, one such technique includes examining a destination address in the header of the packet to determine the destination processor 54. Flow control device 60 may direct packets to processors 54 using one or more flow controllers 62. According to one embodiment, flow control device 60 may represent a programmable semiconductor device such as a field programmable gate array (FPGA) located at a daughter card of a baseboard card of switch 30.

Flow controllers 62 store packets for processors 54. Flow controllers 62 may include one or more buffers to store packets for processors 54. In one embodiment, flow controllers 62 may forward the stored packets to processors 54. In another embodiment, processors 54 may retrieve the stored packets from flow controllers 62. As described in more detail below with reference to FIG. 2, flow controllers may transmit message 64 to network processor 20 to control a transmission rate of packets from network processor 20 to processors 54. For example, if flow controller 62 determines that processor 54 is congested, flow controller 62 may transmit a first message 64 to network processor 20 to indicate processor 54 is congested. If flow controller 62 determines that processor 54 is not congested, flow controller 62 may transmit a second message 64 to network processor 20 to indicate processor 54 is not congested.

Message 64 refers to any suitable communication that indicates congestion information for processor 54. Message 64 may be transmitted in any suitable manner. For example, message 64 may be transmitted via an interrupt that is routed to network processor 20. As another example, message 64 may be transmitted to network processor 20 by sending a pre-programmed packet identifying which processor 54 is congested.

Message 64 may include a priority parameter to indicate a level of priority for message 64. For example, a priority level may indicate a high level or priority for message 64. For example, if the number is set to "1," then message 64 may be processed by a network device with a high priority. Alternatively, if the number is set to "0," then message 64 may be processed by a network device with a normal priority. In other embodiments, the priority level may include other example numbers. As described in more detail below, in particular embodiments, providing a high priority for message 64 may result in rapid processing of message 64, which maximizes the utilization of resources and increases the overall performance of system 10.

According to one embodiment of operation, flow control device 60 receives packets from port 32*b*. Flow control device 60 directs the packets to flow controller 62 corresponding to the destination processor 54. Flow controller 62 stores the packets in a buffer and forwards the packets to processor 54 at a normal rate. For example, during a normal rate, flow controller 62 may store packets at a rate that is substantially similar to the rate at which flow controller 62 forwards packets to processor 54.

As processor 54 processes the packets, processor 54 may become congested. For example, processor 54 may receive a burst of small packets. As another example, processor 54 may receive a burst of packets requiring additional processing time. As another example, processor 54 may use processing cycles for maintenance, control, or any other task other than packet processing.

If processor 54 becomes congested, the processing rate of processor 54 may decrease. If the processing rate of processor 54 decreases, the occupancy level of the buffer of flow controller 62 may increase. As the occupancy level increases, the buffer may become full and switch 30 may experience head-of-line blocking. In this situation, packets for processor 54 may remain blocked in an interface to switch port 32*b* that is shared by other processors 54. Until the waiting packets are taken from the interface to switch port 32*b* by processor 54, packets that arrive after the waiting packets cannot be taken by other processors 54. This causes a packet buildup in the shared interface to switch port 32*b*, also referred to as head-of-line blocking.

In order to prevent head-of-line blocking, when the occupancy level of the buffer is greater than a first predetermined threshold, flow controller 62 transmits a first message 64 to network processor 20 to indicate processor 54 is congested. Network processor 20 may process first message 64 and decrease the transmission rate of packets to processor 54. In one embodiment, network processor 20 may stop the transmission rate of packets altogether. In various embodiments, flow controller 62 may send multiple messages 64 over any suitable time interval to network processor 20 to indicate processor 54 is congested.

Processor 54 may continue to process packets from the buffer of flow controller 62 until the occupancy level of the buffer is less than a second predetermined threshold. Flow controller 62 may subsequently transmit a second message 64 to network processor 20 to indicate processor 54 is not congested. Network processor 20 may process second message 64 and increase the transmission rate of packets to processor 54. In one embodiment, if network processor 20 stopped the transmission rate of packets, network processor 20 may start the transmission rate of packets. In various embodiments, flow controller 62 may send multiple messages 64 over any suitable time interval to network processor 20 to indicate processor 54 is not congested.

According to one embodiment, first and second messages 64 may each include one or more priority parameters that indicate a high level of priority for first and second messages 64. Providing a priority parameter indicating a high level of priority for first and second messages 64 may ensure that processor 54 continues to receive packets and the amount of memory required in the buffer of flow controller 62 may be minimized. Thus, the utilization of resources may be maximized and the overall performance of system 10 may be increased.

A component of system 10 may include any suitable arrangement of elements, for example, an interface, logic, memory, other suitable element, or a combination of any of the preceding. An interface receives input, sends output, processes the input and/or output, performs other suitable operation, or performs a combination of any of the preceding. An interface may comprise hardware and/or software.

Logic performs the operations of the component, for example, executes instructions to generate output from input. Logic may include hardware, software, other logic, or a combination of any of the preceding. Certain logic, such as a processor, may manage the operation of a component. Examples of a processor include one or more computers, one or more microprocessors, one or more applications, other logic, or a combination of any of the preceding.

A memory stores information. A memory may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), other computer-readable medium, or a combination of any of the preceding.

Modifications, additions, or omissions may be made to system 10 without departing from the scope of the invention. The components of system 10 may be integrated or separated. Moreover, the operations of system 10 may be performed by more, fewer, or other components. For example, the operations of flow control device 60 may be performed by more than one component. Additionally, operations of system 10 may be performed using any suitable logic. As used in this document, "each" refers to each member of a set or each member of a subset of a set.

FIG. 2 illustrates one embodiment of flow controller 62 that may be used with system 10 of FIG. 1. In the illustrated embodiment, flow controller 62 receives packets at a rate $R_i$ 68. Flow controller 62 stores the packets in buffer 66. Flow controller 62 forwards the packets to processor 54 at a rate $R_o$ 70. Flow controller 62 may be operable to determine that processor 54 is congested by monitoring an occupancy level of buffer 66. Monitoring the occupancy level of buffer 66 may reduce or prevent head-of-line blocking problems as described above.

Flow controller 62 may monitor buffer 66 according to one or more techniques. In one embodiment, flow controller 62 may include one or more predetermined thresholds to determine that processor 54 is congested. For example, flow controller 62 may include a start threshold 78, a stop threshold 80, and a drop threshold 82.

Start threshold 78, stop threshold 80, and drop threshold 82 may have any suitable value and may be associated with an address of buffer 66. Start threshold 78, stop threshold 80, and drop threshold 82 may be the same or different for different flow controllers 62. For example, the value of stop threshold 80 may be selected according to the processing speed of processor 54 during normal operation. The value of stop threshold 80 may be sufficiently small to provide adequate notification of congestion at processor 54, but may be sufficiently large to allow buffer 66 to buffer more packets.

As another example, the value of stop threshold 80 may be selected to minimize the size of buffer 66 beyond stop threshold 80. For example, the size of buffer 66 beyond stop threshold 80 may occupy a memory size of 10K bytes if network processor 20 is operable to process message 64a in, for example, less than 50 microseconds.

As another example, the value of start threshold 78 and stop threshold 80 may be selected to minimize the number of messages 64 transmitted to network processor 20 if the occupancy level of buffer 66 fluctuates. For example, if rate $R_i$ 68 increases beyond rate $R_o$ 70 periodically, the value of stop threshold 80 may be set to a sufficiently large value to avoid sending excess messages 64 to network processor 20.

According to one embodiment of operation, if processor 54 is operating at a normal rate, packets may be received and forwarded by flow controller 62 at substantially the same rate (rate $R_i$ 68 is substantially similar to rate $R_o$ 70). Therefore, packets do not build up in buffer 66 and the occupancy level of buffer 66 may be less than stop threshold 80.

As processor 54 processes packets, processor 54 may become congested. For example, processor 54 may receive a burst of small packets. As another example, processor 54 may receive a burst of packets requiring additional processing time. As another example, processor 54 may use processing cycles for maintenance, control, or any other task other than packet processing.

If the processing rate of processor 54 decreases due to congestion, the occupancy level of buffer 66 may increase. If flow controller 62 establishes that the occupancy level of buffer 66 is greater than stop threshold 80, flow controller 62 may transmit a first message 64a to network processor 20 indicating processor 54 is congested. In one embodiment, network processor 20 may decrease its transmission rate in response to message 64. In another embodiment, network processor 20 may stop its transmission rate in response to first message 64a. By decreasing or stopping its transmission rate, network processor 20 may reduce the risk of transmitting packets to flow controller 62 that may lead to the occupancy level of buffer 66 exceeding drop threshold 82. If the occupancy level of buffer 66 exceeds drop threshold 82, one or more packets may be dropped, which may lead to a loss of data.

If the processing rate of processor 54 improves, the occupancy level of buffer 66 may decrease. If flow controller 62 establishes that the occupancy level of buffer 66 is less than start threshold 78, flow controller 62 may transmit a second message 64b to network processor 20 indicating processor 54 is not congested. In one embodiment, network processor 20 may increase its transmission rate in response to second message 64b. In another embodiment, network processor 20 may start its transmission rate in response to second message 64b.

By increasing or starting its transmission rate, network processor 20 may reduce the risk of processor 54 running out of packets for processing.

Messages 64a and 64b may include one or more priority parameters. For example, a priority parameter may indicate a high level of priority for messages 64a and 64b. In one embodiment, providing a high level of priority for messages 64a and 64b may result in rapid processing of messages 64a and 64b at network processor 20. Rapid processing of messages 64a and 64b maximizes the utilization of resources in system 10. For example, rapid processing of first message 64a may minimize the size of buffer 66 beyond stop threshold 80.

Modifications, additions, or omissions may be made to flow controller 62 without departing from the scope of the invention. The components of flow controller 62 may be integrated or separated. Moreover, the operations of flow controller 62 may be performed by more, fewer, or other components. For example, the operations of flow controller 62 and buffer 66 may be performed by one component, or the operations may be performed by more than one component. Additionally, operations of flow controller 62 may be performed using any suitable logic.

FIG. 3 illustrates one embodiment of a method for controlling a transmission rate of packet traffic that may be used by system 10 of FIG. 1. The method begins at step 110, where flow controller 62 receives packets for processor 54. Flow controller 62 stores the packets in a buffer at step 112.

Flow controller 62 may determine that processor 54 is congested at step 114. Flow controller 62 may determine that processor 54 is congested by establishing that an occupancy level of the buffer is greater than a first predetermined threshold. If flow controller 62 determines that processor 54 is not congested, the method returns to step 110. If flow controller 62 determines that processor 54 is congested, the method proceeds to step 116.

Flow controller 62 may transmit a first message 64 to network processor 20 indicating that processor 54 is congested at step 116. In one embodiment, network processor 20 may decrease the transmission rate of packets to processor 54 in response to first message 64.

Flow controller 62 may subsequently determine if processor 54 is congested at step 118. Flow controller 62 may determine that processor 54 is not congested by establishing that an occupancy level of the buffer is less than a second predetermined threshold. If flow controller 62 determines that processor 54 is not congested the method proceeds to step 120.

Flow controller 62 may transmit a second message 64 to network processor 20 indicating that processor 54 is not congested at step 120. In one embodiment, network processor 20 may increase the transmission rate of packets to processor 54 in response to second message 64. After transmitting second message 64, the method terminates.

Modifications, additions, or omissions may be made to the method without departing from the scope of the invention. The method may include more, fewer, or other steps. Additionally, steps may be performed in any suitable order.

Certain embodiments of the invention may provide one or more technical advantages. A technical advantage of one embodiment may be that a flow controller monitors packet traffic from a network processor to a number of processors. If the flow controller determines that one of the processors is congested, the flow controller may transmit a message to the network processor to decrease a transmission rate of packet traffic to the congested processor.

Another technical advantage of one embodiment may be that the flow controller includes a buffer to store traffic for a particular processor. One or more predetermined thresholds of the buffer may be used to monitor an occupancy level of the buffer. If the occupancy level exceeds a first predetermined threshold, the flow controller may determine the processor is congested and transmit a message to the network processor to decrease the transmission rate. If the occupancy level is lower than a second predetermined threshold, the flow controller may determine the corresponding processor is not congested and transmit a message to the network processor to increase the transmission rate.

Another technical advantage of one embodiment may be that the flow controller transmits the message to the network processor with a priority parameter. For example, providing a priority parameter with a high level of priority for the message may result in rapid processing of the message at the network processor. Rapid processing of the message at the network processor may maximize the utilization of resources and may reduce the size of the buffer in the flow controller.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method for controlling a transmission rate of packet traffic, comprising:
 receiving a plurality of packets from a network processor;
 storing the plurality of packets in a buffer associated with at least one processor;
 determining that the at least one processor is congested by establishing that an occupancy level of the buffer is greater than a first predetermined threshold;
 transmitting a first message to the network processor indicating that the at least one processor is congested, the first message comprising a priority parameter that indicates a level of priority for the first message, the priority parameter indicating a high level of priority for the first message resulting in rapid processing of the first message at the network processor;
 decreasing a transmission rate of the network processor in response to the first message, the decreased transmission rate being greater than zero;
 determining that the at least one processor is not congested by establishing that an occupancy level of the buffer is less than a second predetermined threshold;
 transmitting a second message to the network processor indicating that the at least one processor is not congested; and
 increasing the transmission rate of the network processor in response to the second message.

2. The method of claim 1, wherein the first predetermined threshold is associated with an address of the buffer.

3. The method of claim 1, further comprising increasing the transmission rate of the network processor to a pre-defined maximum rate.

4. The method of claim 1, further comprising examining a destination address in a header of at least one of the plurality of packets to identify the at least one processor.

5. A system for controlling a transmission rate of packet traffic, comprising:
 a flow controller comprising a buffer associated with at least one processor, the flow controller operates to:
 receive a plurality of packets from a network processor;

store the plurality of packets in the buffer associated with the at least one processor;

determine that the at least one processor is congested by establishing that an occupancy level of the buffer is greater than a first predetermined threshold;

transmit a first message to the network processor indicating that the at least one processor is congested, the first message comprising a priority parameter that indicates a level of priority for the first message, the priority parameter indicating a high level of priority for the first message resulting in rapid processing of the first message at the network processor;

decrease a transmission rate of the network processor in response to the first message, the decreased transmission rate being greater than zero;

determine that the at least one processor is not congested by establishing that an occupancy level of the buffer is less than a second predetermined threshold;

transmit a second message to the network processor indicating that the at least one processor is not congested; and increase the transmission rate of the network processor in response to the second message.

6. The system of claim 5, wherein the first predetermined threshold is associated with an address of the buffer.

7. The system of claim 5, the network processor further operable to increase the transmission rate of the network processor to a pre-defined maximum rate.

8. The system of claim 5, the network processor further operable to examine a destination address in a header of at least one of the plurality of packets to identify the at least one processor.

9. A computer-readable storage media comprising logic for controlling a transmission rate of packet traffic, the logic operates, when executed on a processor, to:

receive a plurality of packets from a network processor;

store the plurality of packets in a buffer associated with at least one processor;

determine that the at least one processor is congested by establishing that an occupancy level of the buffer is greater than a first predetermined threshold;

transmit a first message to the network processor indicating that the at least one processor is congested, the first message comprising a priority parameter that indicates a level of priority for the first message, the priority parameter indicating a high level of priority for the first message resulting in rapid processing of the first message at the network processor;

decrease a transmission rate of the network processor in response to the first message, the decreased transmission rate being greater than zero;

determine that the at least one processor is not congested by establishing that an occupancy level of the buffer is less than a second predetermined threshold;

transmit a second message to the network processor indicating that the at least one processor is not congested; and increase the transmission rate of the network processor in response to the second message.

10. The logic of claim 9, wherein the first predetermined threshold is associated with an address of the buffer.

11. The logic of claim 9, further operable to increase the transmission rate of the network processor to a pre-defined maximum rate.

12. The logic of claim 9, further operable to examine a destination address in a header of at least one of the plurality of packets to identify the at least one processor.

* * * * *